US010655565B2

(12) United States Patent
Le Cras et al.

(10) Patent No.: US 10,655,565 B2
(45) Date of Patent: May 19, 2020

(54) PROPELLANT INJECTOR ALLOWING PROPELLANT TO BE DISCHARGED WHILE ENSURING UNIFORM INJECTION

(71) Applicant: ARIANEGROUP SAS, Paris (FR)

(72) Inventors: Jean-Luc Le Cras, Saint-Marcel (FR); Olivier Delahaye, Oissel (FR); Didier Guichard, Menilles (FR); Carlos Cruz, Gaillon (FR); Erwan Humbert, Bois-Jerome Saint-Ouen (FR)

(73) Assignee: ARIANEGROUP SAS, Paris (FR)

( * ) Notice: Subject to any disclaimer, the term of this patent is extended or adjusted under 35 U.S.C. 154(b) by 272 days.

(21) Appl. No.: 15/554,464

(22) PCT Filed: Mar. 2, 2016

(86) PCT No.: PCT/FR2016/050464
§ 371 (c)(1),
(2) Date: Aug. 30, 2017

(87) PCT Pub. No.: WO2016/139417
PCT Pub. Date: Sep. 9, 2016

(65) Prior Publication Data
US 2018/0073465 A1     Mar. 15, 2018

(30) Foreign Application Priority Data
Mar. 5, 2015 (FR) ........................... 15 51867

(51) Int. Cl.
*F02K 9/52*     (2006.01)
*F02K 9/42*     (2006.01)
(Continued)

(52) U.S. Cl.
CPC ................ *F02K 9/52* (2013.01); *B64G 1/401* (2013.01); *F02K 9/42* (2013.01); *F02K 9/44* (2013.01);
(Continued)

(58) Field of Classification Search
CPC ... F02K 9/42; F02K 9/425; F02K 9/44; F02K 9/52; F02K 9/95; F23D 2202/00; F23C 2700/02; F23R 3/36; B64G 1/401
See application file for complete search history.

(56) References Cited

U.S. PATENT DOCUMENTS 2,902,823 A * 9/1959 Wagner .................... F02K 9/52
                                                        60/730
4,621,492 A   11/1986 von Pragenau
(Continued)

FOREIGN PATENT DOCUMENTS

FR      2 967 726 A1      5/2012

OTHER PUBLICATIONS

International Search Report dated May 11, 2016 in PCT/FR2016/050464 filed Mar. 2, 2016.
(Continued)

*Primary Examiner* — William H Rodriguez
*Assistant Examiner* — Kyle Robert Thomas
(74) *Attorney, Agent, or Firm* — Oblon, McClelland, Maier & Neustadt, L.L.P.

(57) ABSTRACT

An injector of a propellant combustion member, the injector including a first feed and a second feed; the first feed being connected to a plurality of feed chimneys arranged around a longitudinal axis; the second feed being configured so as to feed an injection chamber; and the injection chamber being connected to a plurality of feed sheaths with injection orifices, each feed chimney being surrounded by a coaxial feed sheath; the injector including a takeoff chamber connected to a takeoff duct for taking off the second propellant, the takeoff chamber being arranged in such a manner as to take off the second liquid propellant from the injection chamber; and it is configured to achieve uniform injection of the second propellant via the injection orifices.

6 Claims, 3 Drawing Sheets

(51) Int. Cl.
*F02K 9/44* (2006.01)
*B64G 1/40* (2006.01)
*F23R 3/36* (2006.01)

(52) U.S. Cl.
CPC .......... *F23R 3/36* (2013.01); *F05D 2250/312* (2013.01); *F23C 2700/02* (2013.01); *F23D 2202/00* (2013.01)

(56) References Cited

U.S. PATENT DOCUMENTS

| | | | |
|---|---|---|---|
| 9,482,184 B2* | 11/2016 | Indersie | F02K 9/52 |
| 2011/0219743 A1 | 9/2011 | Johnson et al. | |
| 2013/0318943 A1* | 12/2013 | Indersie | F02K 9/52 60/200.1 |
| 2014/0051028 A1* | 2/2014 | Matejczyk | B23K 15/0086 431/2 |

OTHER PUBLICATIONS

Notice of Rejection dated Dec. 17, 2019 in corresponding Japanese Patent Application No. 2017-564956 (with English translation)(10 pages).

* cited by examiner

PROPELLANT INJECTOR ALLOWING PROPELLANT TO BE DISCHARGED WHILE ENSURING UNIFORM INJECTION

GENERAL TECHNICAL FIELD

The present invention relates to the field of combustion members, e.g. the combustion chamber of a space vehicle engine, and more precisely it relates to the structure of a propellant injector for a combustion member.

STATE OF THE ART

Combustion members include an injector adapted to inject and mix two propellants in a manner that is as uniform as possible.

Unfortunately, in the context of certain applications, a portion of one of the propellants is taken off in order to feed some other member, e.g. a turbine.

Injection systems thus commonly include a takeoff duct, for taking off one of the propellants prior to injection. However such propellant takeoff disturbs the flow and therefore interferes with obtaining injection that is uniform.

Injector structures have been proposed for the purpose of limiting the disturbances to the flow due to propellant being taken off, however they are found to be very complex to make, and very constraining in terms of leaktightness because of the segmentation needed for making such parts.

SUMMARY OF THE INVENTION

The present invention thus seeks to remedy those problems at least in part, and proposes an injector for a propellant combustion member, the injector comprising:
- a first feed adapted to feed a first liquid propellant; and
- a second feed adapted to feed a second liquid propellant;
- the first feed being connected to a plurality of feed chimneys arranged around an ignition tube presenting a longitudinal axis, said feed chimneys extending along said longitudinal axis;
- the second feed being configured so as to deliver a uniform flow of liquid into an injection chamber; and
- said injection chamber being connected to a plurality of feed sheaths by means of injection orifices, each feed chimney being surrounded by a coaxial feed sheath so that the feed chimneys and the feed sheaths are fed in parallel respectively with the first and second propellants;
- the injector being characterized in that:
- it further comprises a takeoff chamber connected to a takeoff duct for taking off the second propellant, said takeoff chamber being arranged in such a manner as to take off the second liquid propellant from the injection chamber in uniform manner; and
- it is configured to achieve uniform injection of the second propellant via the injection orifices.

In a particular embodiment, the takeoff chamber is connected to the injection chamber via a plurality of takeoff channels opening out into the injection chamber in a regular distribution around the longitudinal axis so that liquid takeoff from the injection chamber via the takeoff channels allows the second propellant to be injected uniformly via the injection orifices.

The injection chamber may then extend in the longitudinal direction defined by the longitudinal axis between a top face and a bottom face, and said takeoff channels are then arranged in the top face of the injection chamber, while the injection orifices are arranged in a bottom portion of the injection chamber extending over two-thirds of the height of the injection chamber measured in the longitudinal direction from the bottom face of the injection chamber.

By way of example, the first feed is connected to the plurality of feed chimneys via a primary injection column configured in such a manner as to feed said feed chimneys uniformly with the first propellant.

By way of example, the primary injection ring is then arranged around the takeoff chamber.

By way of example, the second feed is connected to the injection chamber via a secondary injection ring configured so as to feed the injection chamber with the second propellant in uniform manner.

By way of example, the feed chimneys are arranged in symmetric manner relative to the longitudinal axis.

By way of example, the injector is formed by an injector head and an injector plate, with the injector head then being formed by way of example as a single piece by additive fabrication, while the injector head may be fabricated by any appropriate method, and may in particular be made out of a highly conductive material that may present conduction different from that of the material from which the injector head is made.

SUMMARY OF THE FIGURES

Other characteristics, objects, and advantages of the invention appear from the following description, which is purely illustrative and non-limiting, and which should be read with reference to the accompanying drawings, in which.

In all of the figures, elements that are in common are identified by numerical references that are identical.

DETAILED DESCRIPTION

Figure 1:
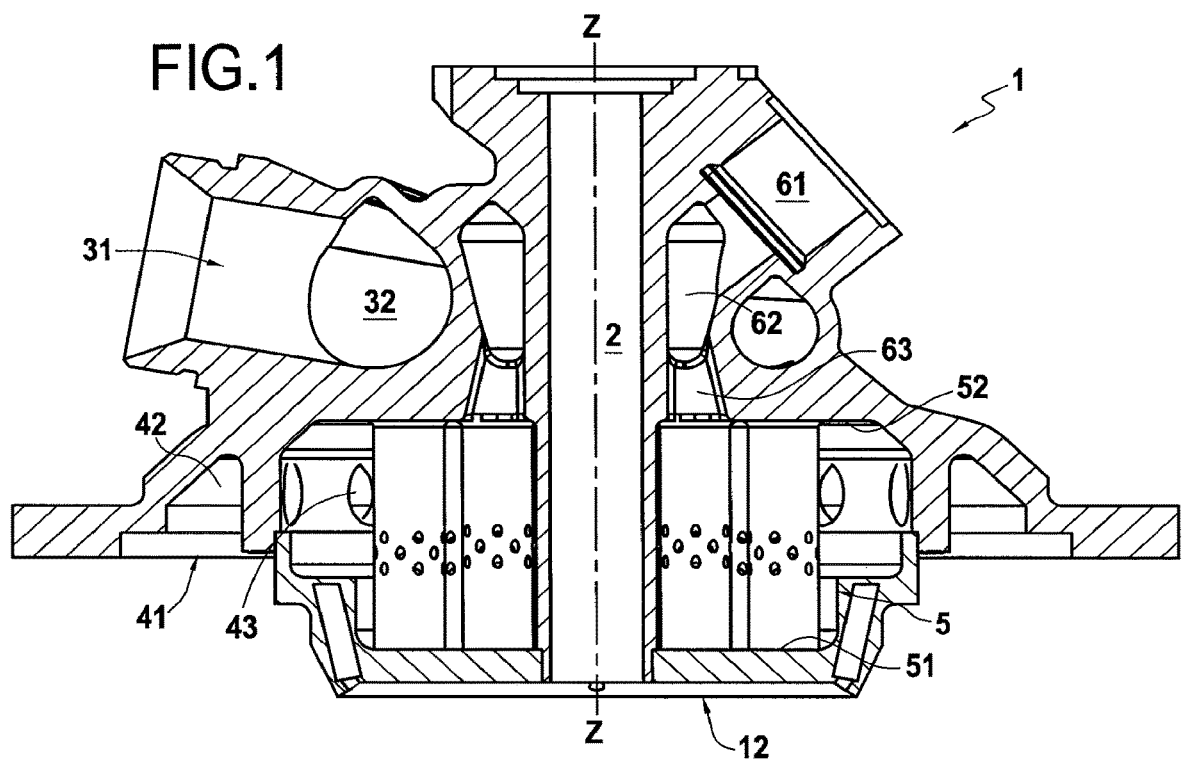
FIGS. 1 and 2 are two section views on two distinct planes of an injector in an aspect of the invention.
Figure 2:
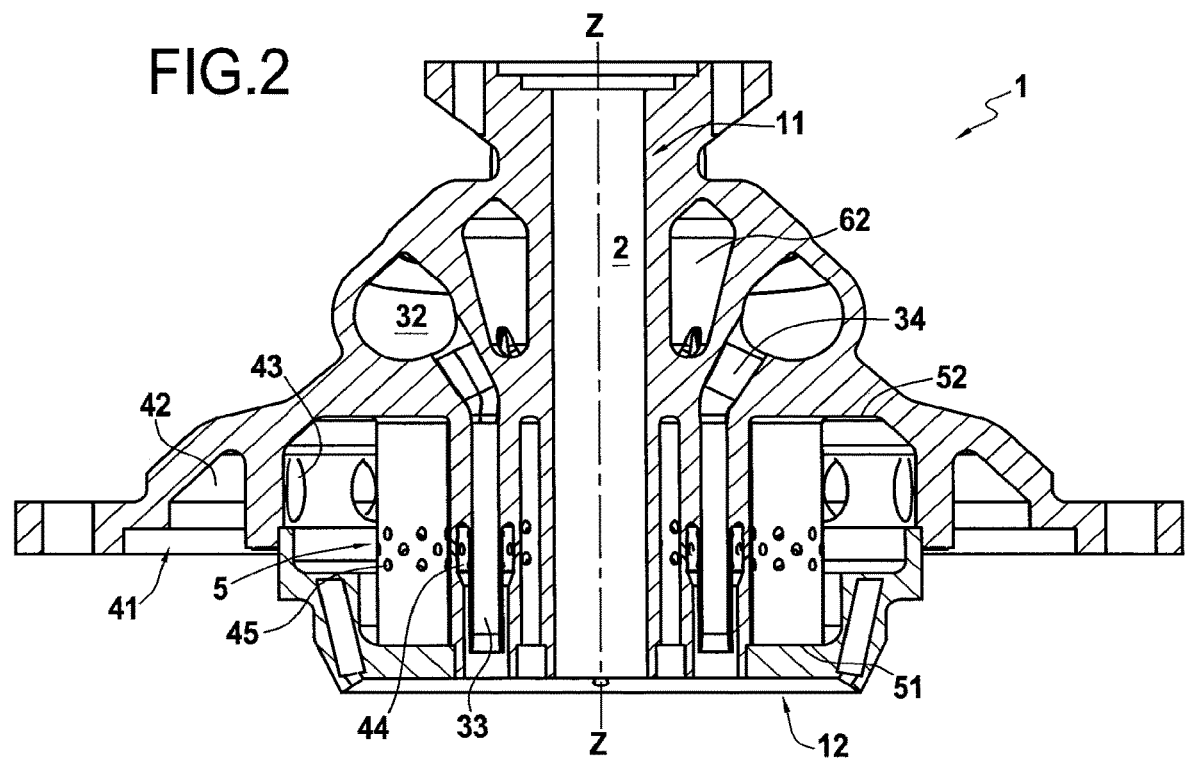

FIGS. 1 and 2 are two section views on two distinct planes of an injector in an aspect of the invention. The two section planes used for FIGS. 1 and 2 are two planes that are mutually perpendicular, each containing a longitudinal axis Z-Z, as shown in the figures.

FIGS. 3 to 6 show these two section views from other viewing angles, serving in particular to show more clearly the internal structure of the injector.

Figure 3:
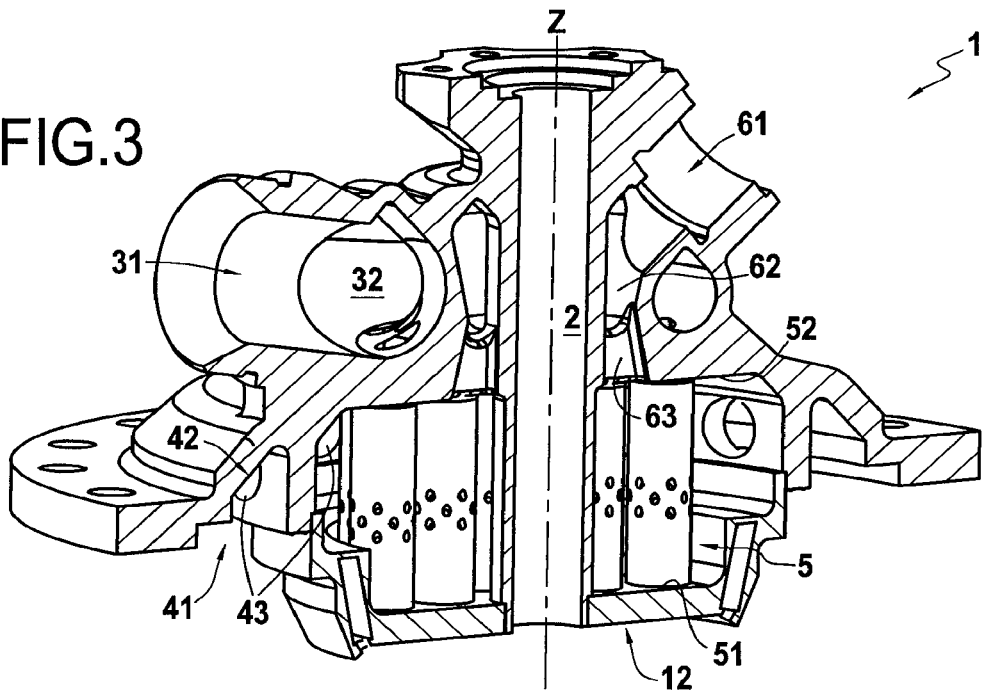
FIGS. 3 to 6 are other views of an injector in an aspect of the invention.
Figure 4:
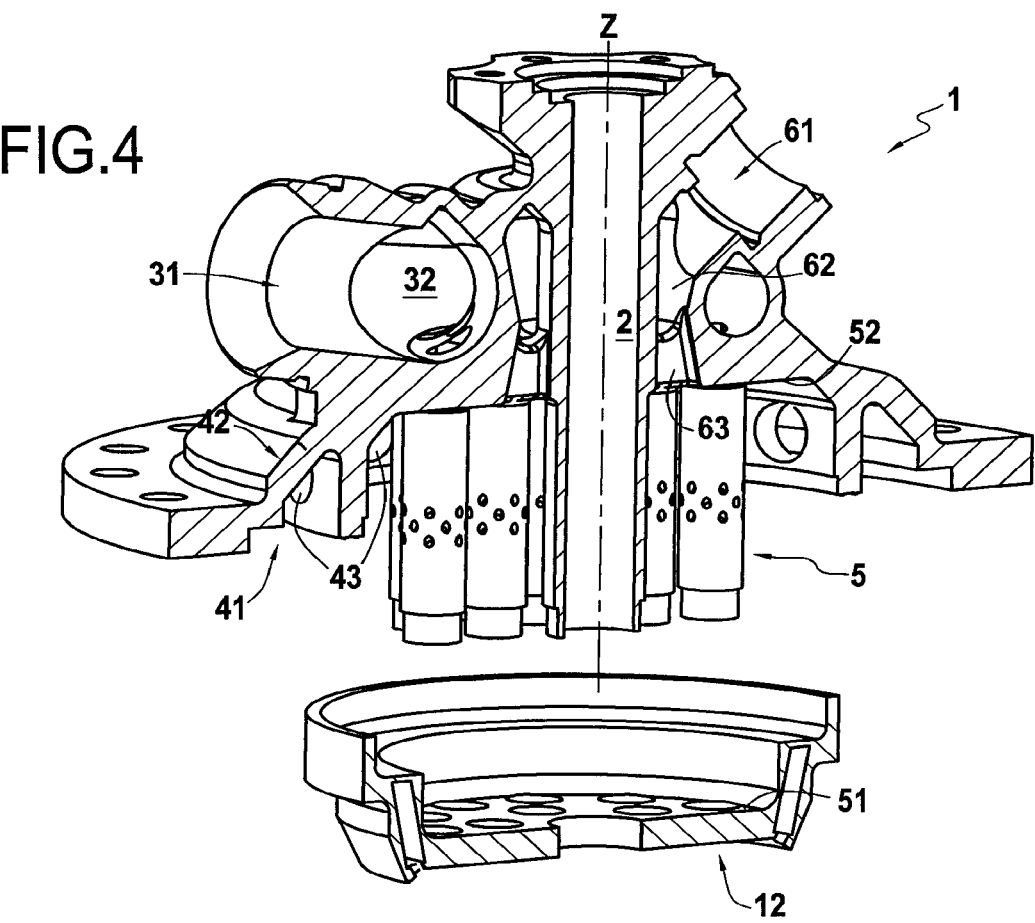
Figure 5:
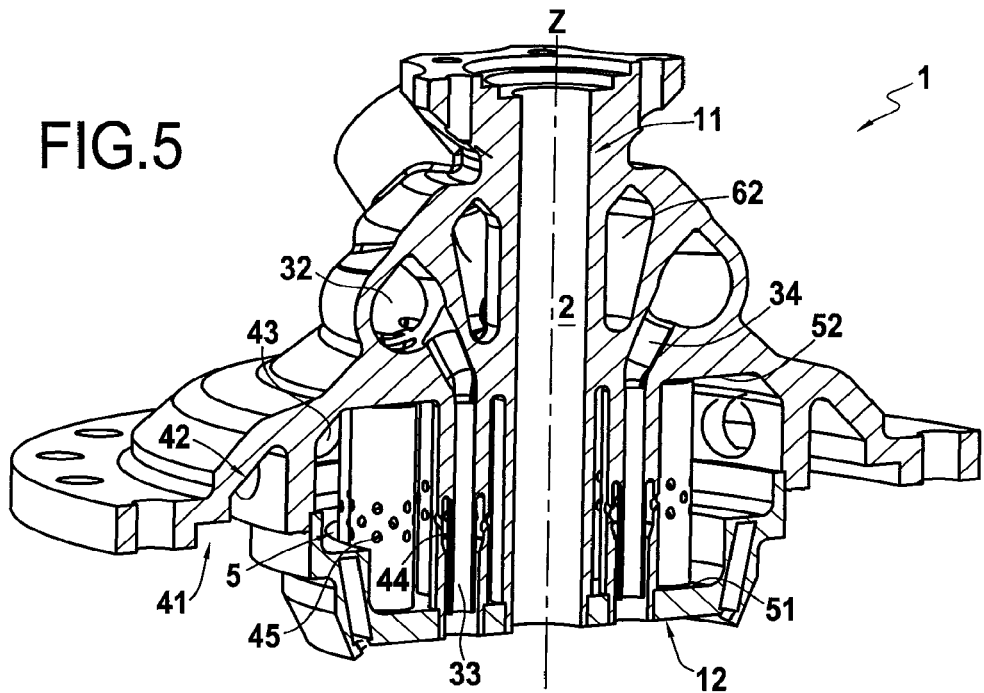
Figure 6:
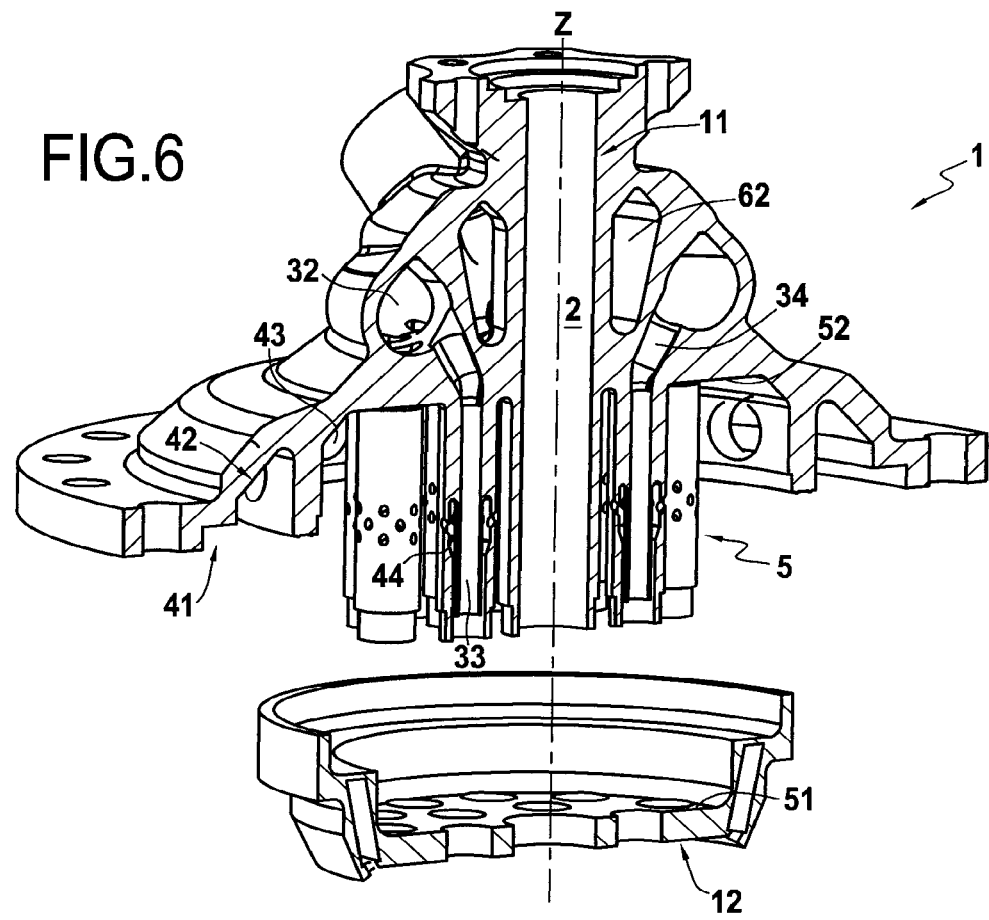

FIGS. 3 and 4 are thus two alternative views to FIG. 1 with FIG. 4 being an exploded view of FIG. 3, and FIGS. 5 and 6 are two alternative views to FIG. 3, with FIG. 6 being an exploded view of FIG. 5.

The figures show an injector 1 having a central igniter tube 2 extending along a longitudinal axis Z-Z defining a longitudinal direction of the injector 1.

The injector 1 as shown is made up of two elements: an injector head 11 and an injector cover 12, which elements are assembled together to form the injector 1.

The injector 1 has two propellant feeds: a first feed 31 adapted to feed the injector 1 with a first propellant, e.g. liquid oxygen; and a second feed 41 adapted to feed the injector 1 with a second propellant, e.g. liquid hydrogen.

The first feed 31 is connected to a plurality of feed chimneys 33 arranged around the igniter tube 2 and each extending in a longitudinal direction, these chimneys opening out to a bottom end of the injector 1.

The first feed 31 is typically connected to the feed chimneys 33 via a primary injection ring 32, e.g. formed by a torus around the longitudinal axis Z-Z. This primary injection ring 32 is configured so as to make uniform the feed of first propellant coming from the first feed 31 via a torus of section that varies in the example shown so as to achieve a uniform feed of the first propellant to the feed chimneys 33.

The second feed 41 serves to feed a second propellant to feed sheaths 44, each surrounding a respective feed chimney 33, typically in such a manner that each feed chimney 33 is surrounded by a coaxial feed sheath 44, and likewise opening out into the bottom end of the injector 1.

The second feed 41 is typically connected to a secondary injection ring 42 that is configured in such a manner as to make uniform the feed of second propellant coming from the second feed 41 in order to feed an injection chamber 5 via feed orifices 43 that are arranged in the secondary injection ring 42, typically in a manner that is symmetrical about the longitudinal axis Z-Z.

A substantially uniform flow of second propellant around the longitudinal axis Z-Z is thus injected into the feed chamber 5. This flow thus fills the feed chamber 5 in substantially uniform manner, and then a portion is injected into the feed sheaths 44 that are arranged around the feed chimneys 33 via injection orifices 45 connecting the feed sheath 44 to the injection chamber 5.

With the injection chamber 5 being fed in uniform manner, the feed sheaths 44 are also fed in uniform manner around the longitudinal axis Z-Z.

The injection chamber 5 as shown extends in the longitudinal direction defined by the longitudinal axis Z-Z. A top face 52 and a bottom face 51 of the injection chamber 5 are thus defined, where the terms "top" and "bottom" are selected arbitrarily.

The injection orifices 45 are then typically formed in a bottom portion of the injection chamber 5, extending over two-thirds of the height of the injection chamber 5 as measured along the longitudinal direction starting from the bottom face 51 of the injection chamber 5, or indeed in the bottom half of the injection chamber 5, extending over half of the height of the injection chamber 5 measured along the longitudinal direction from the bottom face 51 of the injection chamber 5.

The injector 1 also has a takeoff duct 61 adapted to take off a portion of the second propellant from the injection chamber 5 in order to feed a component such as a turbine, for a downstream cooling circuit, or a low pressure type igniter that operates continuously.

The takeoff duct 61 as shown is connected to a takeoff chamber 62 that typically extends around the longitudinal axis Z-Z and that is connected to the injection chamber 5 by means of a plurality of takeoff channels 63.

The takeoff chamber 62 is typically arranged in symmetrical manner around the longitudinal axis Z-Z and is configured so as to ensure that the flow of the second propellant that is taken off by the takeoff channels 63 is uniform in order to ensure that a uniform flow of second propellant is delivered by the takeoff duct 61.

By way of example, the takeoff channels 63 open out into the injection chamber 5 via the top face 52 of the injection chamber 5.

Thus, the second propellant is injected into the injection chamber 5 via the secondary injection ring 42, and then a portion of the second propellant is injected into the feed sheaths 44 via the injection orifices 45, while another portion of the second propellant is taken off via the takeoff channels 63, the takeoff chamber 62, and the takeoff duct 61.

The takeoff channels 63 are arranged in the injector 1 in such a manner as to avoid disturbing the flow of the second propellant within the injection chamber 5, and thus in such a manner that the flow of the second propellant as injected into the feed sheaths 44 via the injection orifices 44 remains uniform around the longitudinal axis Z-Z.

The takeoff channels 63 are thus arranged with a regular distribution around the longitudinal axis Z-Z so as to take off the second propellant in axisymmetric manner relative to the longitudinal axis Z-Z.

Such a regular distribution around the longitudinal axis Z-Z thus makes it possible to take off the second propellant in uniform manner, such that the dynamic pressure profile in register with the various injection orifices 45 is uniform around the longitudinal axis Z-Z, thereby causing the flow of second propellant that is injected into the feed sheaths 44 via the injection orifices 45 to be uniform around the longitudinal axis Z-Z.

The injector 1 may have a multitude of takeoff channels 63, in particular for the purpose of making uniform the impact of these takeoffs on the injection of the second propellant.

The takeoff channels 63 can thus be distributed around the longitudinal axis Z-Z over all or part of the top face 52 of the injection chamber 5. By way of example, the takeoff channels 63 may be distributed over a plurality of concentric circles about the longitudinal axis Z-Z.

By way of example, the injector 1 may thus include an intermediate chamber between the takeoff chamber 62 and the injection chamber 5, with a multitude of takeoff channels 63 being connected thereto. By way of example, this intermediate chamber then extends substantially radially relative to the longitudinal axis Z-Z and provides the connection between the takeoff channels 63 and the takeoff chamber 62.

Furthermore, the takeoff channels 63 are advantageously arranged at a distance from the injection orifices 45 that is sufficient to ensure that taking off the second propellant via the takeoff channels 63 does not disturb the dynamic pressure profile in register with the various injection orifices 45, or at least that the disturbances that are generated are limited, so that the injection of the second propellant into the feed sheaths 44 via the injection orifices 45 remains uniform around the longitudinal axis Z-Z, i.e. in such a manner that the various feed sheaths 44 are fed uniformly around the longitudinal axis Z-Z by the injection orifices 45.

In the embodiment shown, the takeoff channels 63 thus open out into the injection chamber 5 via the top face 52 of the injection chamber 5, while the injection orifices 45 are arranged substantially halfway up between the top face 52 and the bottom face 51 of the injection chamber 5.

By ensuring minimum spacing in this way between the takeoff channels 63 and the injection orifices 45, it is possible to avoid the discharge of the second propellant via the takeoff channels 63 disturbing the dynamic pressure profile in register with the various injection orifices 45.

The injector 1 as proposed thus makes it possible to take off the second propellant without disturbing the injection that it performs, which is advantageous, in particular in terms of injection stability and also in terms of uniformity of combustion temperature among the injection rings.

By way of example, the injector 1 is made by using an additive fabrication method. In the event of the injector 1 being made up of a plurality of components, e.g. as shown in the figures where the injector 1 as shown is made up of two elements, namely an injector head 11 and an injector plate 12. The injector head is then typically made by additive fabrication so as to be formed as a single piece, while the injector plate may be made by any other means.

Such a fabrication method makes it possible to make complex shapes in a single piece, or at least in a limited number of pieces, including in particular an array of internal ducts and volumes, while nevertheless remaining simpler to implement than using a casting method with destroyable cores or than using a method requiring subsequent assembly of numerous components, for example.

The invention claimed is:

1. An injector of a propellant combustion member, the injector comprising:

a first feed adapted to feed a first liquid propellant; and a second feed adapted to feed a second liquid propellant;

the first feed being connected to a plurality of feed chimneys arranged around an ignition tube presenting a longitudinal axis, said feed chimneys extending along said longitudinal axis;

the second feed being configured so as to deliver a uniform flow of liquid into an injection chamber; and said injection chamber being connected to a plurality of feed sheaths with injection orifices, each feed chimney being surrounded by a coaxial feed sheath so that the feed chimneys and the feed sheaths are fed in parallel respectively with the first and second propellants;

wherein the injector further comprises a takeoff chamber connected to a takeoff duct for taking off the second propellant, said takeoff chamber being arranged in such a manner as to take off the second liquid propellant from the injection chamber;

wherein the injector is configured to achieve uniform injection of the second propellant via the injection orifices;

wherein the takeoff chamber is connected to the injection chamber via a plurality of takeoff channels opening out into the injection chamber in a regular distribution around the longitudinal axis so that liquid takeoff from the injection chamber via the takeoff channels allows the second propellant to be injected uniformly via the injection orifices;

wherein the injection chamber extends in the longitudinal direction defined by the longitudinal axis between a top face and a bottom face; and wherein said takeoff channels are arranged in the top face of the injection chamber, while the injection orifices are arranged in a bottom portion of the injection chamber, said bottom portion extending over two-thirds of the height of the injection chamber measured in the longitudinal direction from the bottom face of the injection chamber.

2. The injector according to claim 1, wherein the first feed is connected to the plurality of feed chimneys via a primary injection ring configured in such a manner as to feed said feed chimneys uniformly with the first propellant.

3. The injector according to claim 2, wherein the primary injection ring is arranged around the takeoff chamber.

4. The injector according to claim 1, wherein the second feed is connected to the injection chamber via a secondary injection ring configured so as to feed the injection chamber with the second propellant in uniform manner.

5. The injector according to claim 1, wherein said feed chimneys are arranged in symmetric manner relative to the longitudinal axis.

6. The injector according to claim 1, formed by an injector head and an injector plate, the injector head being made as a single piece by additive fabrication.

* * * * *